(12) United States Patent
Wu et al.

(10) Patent No.: US 8,068,776 B2
(45) Date of Patent: *Nov. 29, 2011

(54) COATED TRANSFER MEMBER

(75) Inventors: Jin Wu, Webster, NY (US); Jonathan H Herko, Walworth, NY (US); Scott J Griffin, Fairport, NY (US); Michael S Roetker, Webster, NY (US); Dennis J Prosser, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 602 days.

This patent is subject to a terminal disclaimer.

(21) Appl. No.: 12/200,179

(22) Filed: Aug. 28, 2008

(65) Prior Publication Data

US 2010/0051171 A1 Mar. 4, 2010

(51) Int. Cl.
*G03G 15/20* (2006.01)
*G03G 15/01* (2006.01)

(52) U.S. Cl. ....... 399/313; 399/308; 399/302; 156/73.4; 430/58.8; 430/60

(58) Field of Classification Search .................. 399/313; 156/73.4; 430/125.32
See application file for complete search history.

(56) References Cited

U.S. PATENT DOCUMENTS

| | | | |
|---|---|---|---|
| 4,532,166 A | 7/1985 | Thomsen et al. | |
| 5,204,201 A * | 4/1993 | Schank et al. | 430/58.8 |
| 5,487,707 A | 1/1996 | Sharf et al. | |
| 6,318,223 B1 | 11/2001 | Yu et al. | |
| 6,397,034 B1 * | 5/2002 | Tarnawskyj et al. | 399/308 |
| 6,440,515 B1 | 8/2002 | Thornton et al. | |
| 6,528,226 B1 * | 3/2003 | Yu et al. | 430/132 |
| 6,602,156 B2 | 8/2003 | Schlueter, Jr. | |
| 6,899,983 B2 * | 5/2005 | Tamoto et al. | 430/58.2 |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 7,771,907 B2 * | 8/2010 | Wu et al. | 430/57.3 |
| 7,826,787 B2 * | 11/2010 | Hatakeyama et al. | 399/346 |
| 2003/0129512 A1 * | 7/2003 | Sugino et al. | 430/66 |
| 2003/0143363 A1 * | 7/2003 | Yuan et al. | 428/58 |
| 2006/0239727 A1 | 10/2006 | Goodman et al. | 399/308 |
| 2008/0311499 A1 * | 12/2008 | Kami et al. | 430/66 |
| 2009/0052942 A1 * | 2/2009 | Lin et al. | 399/159 |

OTHER PUBLICATIONS

Jin Wu, U.S. Appl. No. 12/200,074 entitled Hydrophobic Carbon Black Intermediate Transfer Components, filed concurrently herewith.
Jin Wu, U.S. Appl. No. 12/200,111 entitled Hydrophobic Polyetherimide/Polysiloxane Copolymer Intermediate Transfer Components, filed concurrently herewith.
Jin Wu et al., U.S. Appl. No. 12/200,147 entitled Coated Seamed Transfer Member, filed concurrently herewith.
Jonathan H. Herko et al., U.S. Appl. No. 11/895,255, entitled Flexible Imaging Member Belt Seam Smoothing Process, filed Aug. 22, 2007.
Jin Wu, U.S. Appl. No. 12/129,995, entitled Polyimide Intermediate Transfer Components, filed May 30, 2008.
Jin Wu, U.S. Appl. No. 12/181,354, entitled Core Shell Intermediate Transfer Components, filed Jul. 29, 2008.
Jin Wu, U.S. Appl. No. 12/181,409, entitled Treated Carbon Black Intermediate Transfer Components, filed Jul. 29, 2008.

* cited by examiner

*Primary Examiner* — David Gray
*Assistant Examiner* — Francis Gray
(74) *Attorney, Agent, or Firm* — Oliff & Berridge, PLC

(57) ABSTRACT

An intermediate transfer member that is fully coated with a self crosslinked acrylic resin.

30 Claims, 1 Drawing Sheet

COATED TRANSFER MEMBER

CROSS REFERENCE TO RELATED APPLICATIONS

Figure 1:
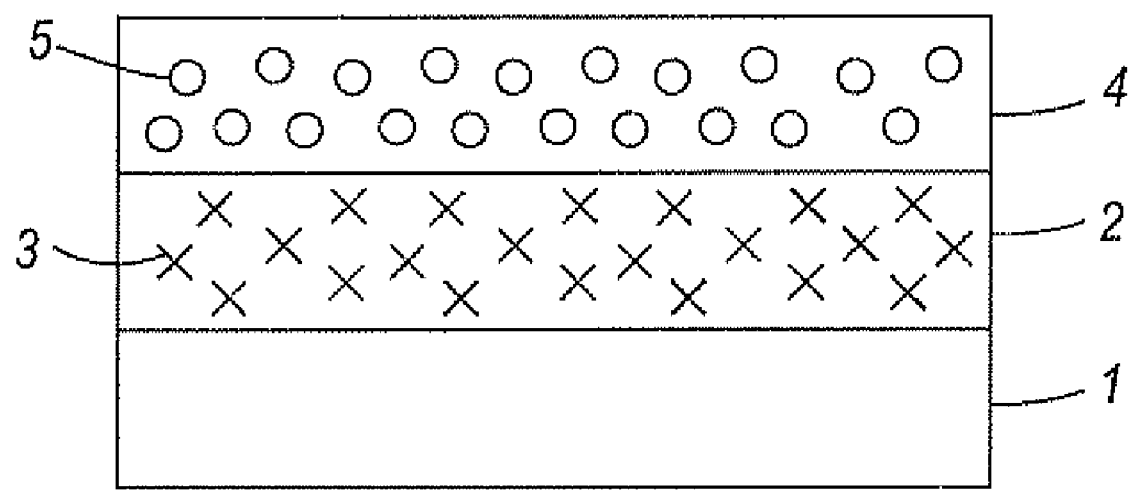

Illustrated in U.S. application Ser. No. 12/200,074, U.S. Publication No. 20100055463, entitled Hydrophobic Carbon Black Intermediate Transfer Components, filed Aug. 28, 2008, is an intermediate transfer member comprised of a substrate comprising a carbon black surface treated with a fluorinated polymer.

Illustrated in U.S. application Ser. No. 12/200,111, U.S. Publication No. 20100055445, entitled Hydrophobic Polyetherimide/Polysiloxane Copolymer Intermediate Transfer Components, filed Aug. 28, 2008, is an intermediate transfer member comprised of a substrate comprising a polyetherimide polysiloxane copolymer.

Illustrated in U.S. application Ser. No. 12/200,147, U.S. Publication No. 20100055328, entitled Coated Seamed Transfer Member, filed Aug. 28, 2008 is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 11/895,255, U.S. Publication No. 20090050255, filed Aug. 22, 2007, the disclosure of which is totally incorporated here by reference, is a process for the post treatment of an ultrasonically welded seamed flexible imaging member belt comprising providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure applied by the heat and pressure applying tool to produce a flexible belt having a smooth welded seam without removing the seam material.

BACKGROUND

Intermediate transfer belts can be generated in the form of seamed belts fabricated by fastening two ends of a web material together, such as by welding, sewing, wiring, stapling, or gluing, and such belts can also be generated in the form of a seamless intermediate transfer belt.

More specifically, seamed belts can be fabricated from a sheet cut from an imaging member web. The sheets are generally rectangular or in the shape of a parallelogram where the seam does not form a right angle to the parallel sides of the sheet. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining where the joining may be effected by any suitable means. Typical joining techniques include welding, such as ultrasonic welding, gluing, taping, pressure heat fusing, and the like.

An ultrasonic welding process is accomplished by retaining in a down position the overlapped ends of a flexible imaging member sheet with a vacuum against a flat anvil surface, and guiding the flat end of an ultrasonic vibrating horn transversely across the width of the sheet, over and along the length of the overlapped ends, to form a welded seam. Ultrasonically welding results in an overlap seam that has an irregular surface topology rendering it difficult for a cleaner blade to clean toner around the seam, and which irregular surface can also cause damage to the cleaner blades by nicking the cleaning edge of the blade. In addition, toner trapping resulting from the poor cleaning and the blade damage causes streaking from the seam, which in turn adversely impacts image quality.

When ultrasonically welded into a belt, the seam of multilayered electrophotographic imaging flexible member belt may occasionally contain undesirable high protrusions such as peaks, ridges, spikes, and mounds. These seam protrusions present problems during image cycling of the belt machine because they interact with cleaning blades to cause blade wear and tear, which ultimately adversely affect cleaning blade efficiency, and reduce service life.

A bump, surface irregularity, or other discontinuity on the surface of the belt and in the seam of the belt may disturb the tuck of the cleaning blade as it contacts the intermediate transfer belt surface to effect residual toner and debris removal. The increased height differential may allow toner to pass under the cleaning blade and not be cleaned. Moreover, seams with a bump or other morphological defects can cause the untransferred residual toner to be trapped in the sites of seam surface irregularities. The seam of an intermediate transfer belt, which is repeatedly subjected to the striking action by a cleaning blade under machine functioning conditions, has triggered the development of premature seam delamination failure. In addition, the discontinuity in belt thickness due to the presence of an excessive seam height yields variances of mechanical strength in the belt and reduces the fatigue flex life of the seam when cycling over the belt module support rollers. As a result, both the cleaning life of the blade and the overall service life of the intermediate transfer belt can be diminished.

Also, such irregularities in the belt height and the seam height emit vibrational noise in xerographic development systems, which noise disturbs the toner image on the belt, and degrades resolution and transfer of the toner image to the final copy sheet. This is particularly prevalent in those applications requiring the application of multiple color layers of liquid or dry developer on an intermediate transfer belt, which are subsequently transferred to a final copy sheet. Further, the seam discontinuity or bump in such a belt may result in inaccurate image registration during development, inaccurate belt tracking, and overall deterioration of motion quality, as a result of the translating vibrations.

In a typical electrostatographic reproducing apparatus, a light image of an original to be copied is recorded in the form of an electrostatic latent image upon a photosensitive member or photoconductor. The latent image is subsequently rendered visible by the application of electroscopic thermoplastic resin particles and colorant, which are commonly referred to as toner. Generally, the electrostatic latent image is developed by contacting the latent image with a developer mixture comprised of carrier granules having toner particles adhering triboelectrically thereto, or there can be selected for development a liquid developer material, which may include a liquid carrier with toner particles, dispersed therein. The developer material is advanced into contact with the electrostatic latent image, and the toner particles are deposited thereon in image configuration. Subsequently, the developed image is transferred to a copy sheet. It is advantageous in some situations to transfer the developed image to a coated intermediate transfer web, belt or component, and subsequently transfer with high transfer efficiency the developed image from the intermediate transfer member to a permanent substrate. The toner image is subsequently usually fixed or fused upon a support, which may be the photoconductor or other support such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members may allow for a number of positive attributes, such as enabling high throughput at modest process speeds, improving registration of the final color toner image in color systems using synchronous development of one or more component colors using one or more transfer stations, and increasing the range of final substrates that can be used.

In operation, an intermediate transfer belt is brought into contact with a toner image-bearing member such as a photoreceptor belt. In the contact zone, an electrostatic field generating device, such as a corotron, a bias transfer roller, a bias blade, or the like, creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either situation, the control of the electrostatic fields in and near the transfer zone is a significant factor in toner transfer.

Thus, there is a need for a seamed member, such as a belt that avoids or eliminates a number of the above disadvantages, and more specifically, there is a need for an ITB with excellent surface topology such that it can withstand dynamic fatigue conditions. For example, the acrylic resin coated belt as disclosed herein provides a smoother belt surface with substantially decreased or eliminated profile protrusions or irregularities thereby extending its service life. Also, there is a need for a substantially completely imageable member which avoids or minimizes a number of the disadvantages indicated herein by overcoating the entire member including the seam, with an acrylic resin that is crosslinked, and which layer is mechanically robust, and electrically is about equal to the surface resistivity of the seamed intermediate transfer belt (ITB).

REFERENCES

Illustrated in U.S. Pat. No. 7,031,647, the disclosure of which is totally incorporated herein by reference, is an imageable seamed belt containing a lignin sulfonic acid doped polyaniline.

Illustrated in U.S. Pat. No. 7,139,519, the disclosure of which is totally incorporated herein by reference, is an intermediate transfer belt, comprising a belt substrate comprising primarily at least one polyimide polymer; and a welded seam.

Illustrated in U.S. Pat. No. 7,130,569, the disclosure of which is totally incorporated herein by reference, is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707, 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

According to embodiments illustrated herein, there is provided a flexible belt that has excellent surface topology while maintaining belt and seam strength, and processes for the preparation of coated flexible belts.

In embodiments, there is disclosed a process for the treatment, especially post treatment of an ultrasonically welded seamed flexible intermediate transfer belt comprising providing a flexible belt having a welded seam extending from one parallel edge to the other parallel edge, the welded seam having a rough seam region comprising an overlap of two opposite edges; positioning the flexible belt on the lower section of an anvil such that the flexible belt is held in position by a vacuum; contacting the rough seam region with a heat and pressure applying tool, and smoothing out the rough seam region with heat and pressure being applied by a known heat and pressure applying tool to produce a flexible belt having a smooth welded seam without removing seam material, and then subsequently coating the belt with a crosslinked, such as a self crosslinking; acrylic resin; and an intermediate transfer member, such as an intermediate transfer belt, comprised of a seamed substrate, and wherein the belt and the seam are coated with a crosslinked acrylic resin.

Moreover, disclosed is a process for the post treatment of an ultrasonically welded seamed flexible intermediate transfer belt comprising providing a flexible belt having a welded seam extending from one parallel edge to the other parallel edge, the welded seam having a rough seam region comprising an overlap of two opposite edges; positioning the flexible belt on the lower section of an anvil, which anvil is known, and includes an upper and lower portion, and wherein the flexible belt is held in position on the lower anvil by a vacuum; contacting the belt rough seam region with heat and pressure device, the heat and pressure applying device or tool being selected from the group consisting of an ultrasonic vibrating horn, an automated heated pressure roller, and a heated upper anvil; and smoothing out the rough seam region with heat and pressure to produce a flexible belt having a smooth welded seam, with substantially no protrusions, and thereafter coating the entire belt with a crosslinked, such as a self crosslinking, acrylic resin.

FIGURE

The following Figure is provided to further illustrate the intermediate transfer members disclosed herein.

FIG. 1 illustrates an exemplary embodiment of an intermediate transfer member of the present disclosure where 1 represents a supporting substrate, 2 represents a layer comprised of a crosslinked acrylic resin 3, and 4 represents an optional release overcoat layer comprised of release components 5.

DETAILED DESCRIPTION

Disclosed are intermediate transfer members, and more specifically, coated intermediate transfer members useful in transferring a developed image in an electrostatographic, for example xerographic, including digital, image on image, and the like, machines or apparatuses. In embodiments, there are selected, for example, seamed intermediate transfer members comprised of carbon black, a polyaniline, or mixtures thereof, which are subsequently dispersed in a polymer solution, such as a polyamic acid solution illustrated in copending applications U.S. application Ser. Nos. 12/129,995, 12/181,354, and 12/181,409, the disclosures of which are totally incorporated herein by reference, and thereafter overcoated with a crosslinked acrylic resin. A number of intermediate transfer members, including seamed members and processes thereof are illustrated for example, in copending application Ser. No. 12/200,074 and U.S. application Ser. No. 12/200,111, the disclosures of each application being totally incorporated herein by reference.

Aspects of the present disclosure relate to a polymeric coated intermediate image transfer member inclusive of flexible belts, fuser belts, pressure belts, intermediate transfer belts, transfuse belts, transport belts, developer belts, and the like. The coated polymeric acrylic resin seamed belts can be prepared by a number of processes, such as a process which forms a strength enhancing bond between voids of mutually mating elements. The strength enhancing bond may comprise a known material which is chemically and physically compatible with the material of the coating layer or layers of the belt. The resulting acrylic resin coated belt possesses a smoothed coated seam such that the welded seam has a smoother surface topology to thereby increase the life of the cleaning blade, and increase the overall service life of the flexible belt. More specifically, embodiments disclosed relate to a post treatment process for efficiently and consistently smoothing an ultrasonically welded flexible belt coated with a self crosslinking acrylic resin that does not degrade seam strength, and where the coating is mechanically robust, and electrically is equal to or about equal to the surface resistivity of the seamed belt.

The coating which is applied to the member, such as belt, is comprised of an acrylic resin, and more specifically, a self crosslinked acrylic resin (that is, for example, a crosslinking component is not needed), such as the resin DORESCO® TA22-8, available from Lubrizol Dock Resins, Linden, N.J., and usually free of any conductive components dispersed therein. By the addition of a small amount of an acid catalyst, the acrylic resin self crosslinks upon thermal curing at temperatures of, for example, from about 80° C. to about 200° C. for a period of time of, for example, from about 1 to about 60 minutes, specifically curing, in embodiments, at about 130° C. for 3 minutes, resulting in a mechanically robust polymeric layer with a surface resistivity of from about $10^9$ to about $10^{13}$ ohm/sq, and more specifically, about $10^{11}$ ohm/sq. While the percentage of crosslinking can be difficult to determine, and not being desired to be limited by theory, the acrylic resin layer is crosslinked to a suitable value, such as for example, from about 30 to about 100 percent, and from about 50 to about 95 percent.

In embodiments, examples of the self crosslinking resin selected for coating the transfer member surface, include a self crosslinking acrylic resin with a weight average molecular weight ($M_w$) of from about 100,000 to about 500,000, or from about 120,000 to about 200,000; a polydispersity index (PDI) ($M_w/M_n$) of from about 1.5 to about 4, or from about 2 to about 3; and a bulk resistivity (20° C. and 50 percent humidity) of from about $10^8$ to about $10^{14}$ Ωcm, or from about $10^9$ to about $10^{12}$ Ωcm. A specific example of the self crosslinking acrylic resin includes DORESCO® TA22-8, obtained from Lubrizol Dock Resins, Linden, N.J., which resin possesses, it is believed, a weight average molecular weight of about 160,000, a polydispersity index of about 2.3, and a bulk resistivity (20° C. and 50 percent humidity) of about $10^{11}$ Ωcm.

Further, examples of the self crosslinking acrylic resin selected for coating the intermediate transfer member, such as a transfer belt, include DORESCO® TA22-51, obtained from Lubrizol Dock Resins, Linden, N.J., and, it is believed, similar acrylic resins available from Lubrizol.

The thickness of the acrylic resin coating on the transfer member, such as a belt, can vary, for example this thickness can be from about 1 to about 20, from about 1 to about 10, from about 1 to about 6, and from about 1 to about 3, and yet more specifically, about 3 microns.

The intermediate transfer member can be of any suitable configuration, examples of which are a sheet, a film, a web, a foil, a strip, a coil, a cylinder, a drum, an endless strip, a circular disc, a belt including an endless belt, and an endless seamed flexible belt. The circumference of the transfer member in a belt configuration of from 1 to 2, or more layers is from about 250 to about 2,500, from about 1,500 to about 2,500, or from about 2,000 to about 2,200 millimeters, with a width of from about 100 to about 1,000, from about 200 to about 500, or from about 300 to about 400 millimeters, and with a thickness of from about 25 to about 500, or from about 50 to 150 microns.

Examples of conductive components in the coating include carbon black, polyaniline, and carbon nanotubes, which components are contained in a polymeric matrix such as polyimides, polycarbonate, polyvinylidene fluorides (PVDF), poly (butylene terephthalates) (PBT), poly(ethylene-co-tetrafluoroethylene) copolymers, and/or their blends thereof.

Nonlimiting examples of catalysts selected for the polymeric acrylic resin overcoat layer include oxalic acid, maleic acid, carboxylic acid, ascorbic acid, malonic acid, succinic acid, tartaric acid, citric acid, p-toluenesulfonic acid, methanesulfonic acid, and the like, and mixtures thereof. A typical concentration of acid catalyst is from about 0.01 to about 5 weight percent based on the weight of the crosslinked acrylic resin.

A blocking agent can also be included in the overcoat layer, which agent can "tie up" or substantially block the acid catalyst effect to provide solution stability until the acid catalyst function is initiated. Thus, for example, the blocking agent can block the acid effect until the solution temperature is raised above a threshold temperature. For example, a blocking agent can be used to block the acid effect until the solution temperature is raised above about 100° C. At that time, the blocking agent dissociates from the acid and vaporizes. The unassociated acid is then free to catalyze the polymerization. Examples of such suitable blocking agents include, but are not limited to, pyridine and commercial acid solutions containing blocking agents such as CYCAT® 4045, available from Cytec Industries Inc.

The end marginal regions of the transfer member like a belt can be joined by gluing, taping, stapling, pressure, and heat fusing to form a continuous member such as a belt, sleeve, or cylinder. Both heat and pressure can be used to bond the end marginal regions into a seam in the overlap region. The flexible member is thus transformed from a sheet of intermediate transfer material into a continuous intermediate transfer belt. The flexible member has a first exterior major surface or side, and a second opposite exterior major surface or side on the opposite side. The seam joins the flexible member so that the bottom surface, generally including at least one layer immediately above, at and/or near the first end marginal region is integral with the top surface, generally including at east one layer immediately below, at and/or near the second end marginal region.

The heat and pressure joining means includes ultrasonic welding to transform the sheet of an intermediate transfer material into an intermediate transfer belt. The belt can be fabricated by ultrasonic welding of the overlapped opposite end regions of a sheet. In the ultrasonic seam welding process, ultrasonic energy applied to the overlap region causes melting of materials present.

Ultrasonic welding can be selected for joining the flexible intermediate transfer member primarily because it is rapid, clean, solvent free, low cost, it produces a thin and narrow seam, and the mechanical high frequency pounding of the welding horn causes generation of heat at the contiguous overlapping end marginal regions of the flexible imaging sheet loop to maximize melting of one or more layers therein to form a strong and precisely defined seam joint. For example, ultrasonic welding and an apparatus for performing the same is disclosed in U.S. Pat. No. 4,532,166, the disclosure of which is totally incorporated herein by reference.

However, the completed ultrasonic welded seam may contain upper and lower splashings at each end of the overlapped transfer member region, which splashings are formed in the process of joining the end marginal regions together. The splashings generally form bumps or protrusions above and below the seam area of the welded flexible intermediate transfer member. The bumps or protrusions of the splashings are undesirable in that they can create image defects if that area of the belt is used in an imaging operation, or that area of the belt is to be avoided in imaging operations. Also, the irregular surface topology of the overlap seam renders it difficult for the cleaner blade to clean toner around the seam. This profile can cause damage to the cleaner blades by nicking the cleaning edge of the blade. The toner trapping from the poor cleaning and the blade damage results in streaking from the seam, and thereby reduces the image quality. The aforementioned disadvantages are minimized or avoided when selecting the acrylic resin overcoating of the present disclosure.

In a specific embodiment, the heat and pressure applying tool selected is an ultrasonic vibrating horn where the lower anvil portion may be a flat anvil. The process smoothes out the rough seam region by making a second welding pass across the welded region such that the rough seam region is further compressed under high pressure and heat. Since the post treatment smoothing process uses the welding horn to further compress the overlap, rather than removing the protruding material, seam strength is not degraded. Moreover, the welded seam may be double welded from the back side of the seam as well. In such embodiments, the second welding pass is made with the seam inverted on the anvil so that the imaging side of the belt is facing down on the anvil. In this manner, the overlap on the image side of the belt can be substantially eliminated as it conforms to the smooth surface of the anvil.

In embodiments, the lower anvil is a round anvil and an edge of the seam region lies on an apex of the lower anvil. In one embodiment, the process smoothes out the rough seam region by traversing the automated heated pressure roller along the seam to reform the edge of the seam region. The heated pressure roller applies pressure on the welded seam against the lower anvil while heating the seam such that a smooth welded seam is produced. The belt can be retained in place by a vacuum on the lower anvil while the heated pressure roller traverses the seam. To effectively heat roll the seam smooth, the seam is positioned so as to be on the apex of the anvil to fully expose the area to be smoothed. The surface of the roller should be tangent to the anvil's apex. Using a round anvil allows heat and pressure to be concentrated along the edge of the overlap. In further embodiments, the heated pressure roller is used in an automated system where the heated roller is affixed to a linear actuator which drives it tangent to the roller's apex along its length. Temperature may be controlled by means of a thermostat controller while pressure may be controlled by spring tension.

In another embodiment, the process illustrated herein smoothes out the rough seam region by applying the heated upper anvil to the edge of the seam region such that the welded seam is sandwiched between the upper and lower anvils. The welded seam is thus compressed under high pressure. Both the upper and lower anvils may be heated so that during the compression, the seam material is also heated close to its glass transition temperature to further facilitate the reformation of the welded seam and to produce a smooth welded seam. The upper and lower anvils may be heated by heating components embedded in the upper and lower anvils, and which are controlled by a thermostatic controller. In this embodiment, the welded seam may be reduced in seam thickness by from about 25 percent to about 35 percent.

Examples of members that can be generated with the processes disclosed herein, where the entire surface of the member is overcoated with the crosslinked acrylic resin, are a flexible belt selected from the group consisting of a photoreceptor, an electroreceptor, and an intermediate image transfer belt. The flexible belt may be comprised of a single layer of a substantially homogeneous material or may comprise at least two different layers having different compositions or properties. Also, in embodiments there may be selected for the acrylic resin coating, puzzle-cut seams and taped seams selected for xerographic systems utilizing tandem or belt designs.

The following examples are provided.

COMPARATIVE EXAMPLE 1

A seamed intermediate transfer belt was prepared as follows. A 3 mil thick intermediate transfer sheet comprised of 91 weight percent of KAPTON® KJ (available from E.I. DuPont) and 9 weight percent of polyaniline (1.7 microns in diameter size) was cut to a size of 362 millimeters wide by 2,210.8 millimeters long. The ends were overlapped by 300 microns, and an ultrasonic horn was used to compress the material against a steel welding platen, melting the material in the overlap region and creating a seam. The seam was then reverse welded followed by smoothing the double-welded seam with sand paper, resulting in a seam of about 100 microns thick.

EXAMPLE I

The Comparative Example 1 seamed ITB was entirely (100 percent) overcoated via flow coating with a polymeric layer of about 6 microns thick. The overcoating solution which was comprised of the self crosslinking acrylic resin, DORESCO®, TA22-8 obtained from Lubrizol, and a p-toluenesulfonic acid (pTSA) acid catalyst in a ratio of 99/1 in an ethanol/acetone/isopropanol solvent mixture, about 20 weight percent solids, was coated via flow coating, resulting in an overcoat layer thickness of 6 microns. The overcoated belt is thermally cured at 130° C. for 3 minutes with minimal perturbation, which is no disruption, or disorder in the ITB itself.

The surface resistivity of the above overcoating was measured using a High Resistivity Meter (Hiresta-Up MCP-HT450 obtained from Mitsubishi Chemical Corp., under 1,000V, and averaging four measurements at varying spots, 72° F./22 percent room humidity). The surface resistivity of the overcoating layer, about $10^{11}$ Ω/sq, was comparable to that of the Comparative Example 1 transfer belt.

The overcoated ITB of Example I and the noncoated ITB of Comparative Example 1 were print tested on a Xerox Corporation DC8000 printer. After 1,000 prints, full page image quality analysis of 50 percent of the halftone images were visually evaluated, especially around the overcoated seam areas. A completely imageable seamed ITB device was obtained with the acrylic resin overcoating, 6 microns in thickness, layer on the sanded, reverse double welded seamed ITB device of Example I. As comparison, the seam regions were visible from the prints when the sanded, reverse double welded seamed ITB device of Comparative Example 1 was subjected to printing. The overcoating layer on the entire seamed ITB belt renders it imageable on the seam.

More specifically, the acrylic resin overcoating belt seam was not visible on any of the above generated prints, thus the seam region was imageable, while the seam of the member of Comparative Example 1 was visible, thus the seam region was not imageable.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A process which comprises
   providing a flexible belt having a welded seam extending from one parallel edge to the other parallel edge, the welded seam having a rough seam region comprising an overlap of two opposite edges;
   contacting the rough seam region with a heat and pressure applying tool; and
   smoothing out of the rough seam region with heat and pressure applied by said heat and pressure applying tool to generate a flexible belt having a smooth welded seam, and subsequently coating the belt with a crosslinked acrylic resin, and wherein a crosslinking amount of the crosslinked acrylic resin is from about 30 to about 100 percent.

2. A process in accordance with claim 1 wherein said crosslinking amount is from about 30 to about 95 percent.

3. A process in accordance with claim 1 wherein said crosslinking amount is from about 40 to about 100 percent.

4. A process in accordance with claim 1 wherein said resin possesses a bulk resistivity at about 20° C. and about 50 percent humidity of from about $10^8$ to about $10^{14}$ Ωcm, a weight average molecular weight ($M_w$) of from about 100,000 to about 500,000, and a polydispersity index (PDI) ($M_w/M_n$) of from about 1.5 to about 4.

5. A process in accordance with claim 1 wherein said resin possesses a bulk resistivity of from about $10^9$ to about $10^{12}$ Ωcm, and a weight average molecular weight ($M_w$) of from about 120,000 to about 200,000.

6. A process in accordance with claim 1 wherein the heat and pressure applying tool is selected from the group consisting of an automated heated pressure roller and a heated anvil.

7. A process in accordance with claim 1 wherein prior to said smoothing the flexible belt is positioned on a lower section of an anvil, and maintained in said position by a vacuum.

8. A process in accordance with claim 6 wherein the smoothing out of the rough seam region is performed by traversing the automated heated pressure roller along the seam to reform the edge of the seam region such that a smooth welded seam is produced.

9. A process in accordance with claim 6 wherein the heat is controlled by a thermostat controller, and the pressure is controlled by spring tension.

10. A process in accordance with claim 7 wherein the smoothing out of the rough seam region is performed by applying the upper section of said anvil to the edge of the seam region such that the welded seam is compressed under pressure and heated to about the glass transition temperature of the seam material such that a smooth welded seam is produced.

11. An intermediate transfer member comprised of a seamed substrate, and wherein the entire member is coated with a crosslinked acrylic resin, and wherein a crosslinking amount of the crosslinked acrylic resin is from about 30 to about 100 percent.

12. An intermediate transfer member in accordance with claim 11 wherein said substrate is comprised of a carbon black and a polyimide, and wherein said crosslinking amount is from about 50 to about 95 percent.

13. An intermediate transfer member in accordance with claim 11 wherein said substrate is comprised of a polyaniline and a polyimide, and wherein said crosslinking amount is from about 50 to about 95 percent.

14. An intermediate transfer member in accordance with claim 11 wherein said member is a flexible belt.

15. An intermediate transfer member in accordance with claim 11 wherein said acrylic resin selected for the coating possesses a bulk resistivity at about 20° C. and about 50 percent humidity of from about $10^8$ to about $10^{14}$ Ωcm, a weight average molecular weight ($M_w$) of from about 100,000 to about 500,000, and a polydispersity index (PDI) ($M_w/M_n$) of from about 1.5 to about 4.

16. An intermediate transfer member in accordance with claim 11 wherein said acrylic resin possesses a bulk resistivity of from about $10^9$ to about $10^{12}$ Ωcm, and a weight average molecular weight ($M_w$) of from about 120,000 to about 200,000.

17. An intermediate transfer member in accordance with claim 11 further comprising an outer release layer positioned on said crosslinked acrylic resin coating.

18. An intermediate transfer member in accordance with claim 17 wherein said release layer comprises a poly(vinyl chloride).

19. An intermediate transfer belt consisting essentially of an entire coated surface, and wherein said coating is comprised of a self crosslinked acrylic resin, and wherein a crosslinking amount of the self crosslinked acrylic resin is from about 50 to about 95 percent.

20. An intermediate transfer belt in accordance with claim 19 wherein the belt includes at least one seam.

21. A process in accordance with claim 1 wherein there is further included in said coating a catalyst selected from the group consisting of oxalic acid, maleic acid, carboxylic acid, ascorbic acid, malonic acid, succinic acid, tartaric acid, citric acid, p-toluenesulfonic acid, methanesulfonic acid, and mixtures thereof, and which catalyst is present in an amount of from about 0.01 to about 5 weight percent based on the weight of the crosslinked acrylic resin.

22. A process in accordance with claim 1 wherein said coating is of a thickness of from about 1 to about 20 microns.

23. A process in accordance with claim 1 wherein said coating is of a thickness of from about 1 to about 10 microns.

24. A process in accordance with claim 1 wherein said coating is of a thickness of from about 3 to about 8 microns.

25. A process in accordance with claim 1 wherein said coating is contained on from about 90 to about 100 percent of the surface of said member.

26. A process in accordance with claim 1 wherein said coating is contained on from about 95 to about 100 percent of the surface of said member.

27. A process in accordance with claim 1 wherein said coating is contained on 100 percent of the surface of said member.

28. A process in accordance with claim 1 wherein said smooth belt and seam are substantially free of protrusions.

29. An intermediate transfer member in accordance with claim 11 wherein said substrate includes a conductive component.

30. An intermediate transfer member in accordance with claim 29 wherein said conductive component is carbon black.

* * * * *